Aug. 3, 1937.                N. STRAUSSLER                 2,089,042
                WHEEL SUSPENSION FOR ENDLESS TRACK VEHICLES
                        Filed Sept. 4, 1935        3 Sheets-Sheet 3
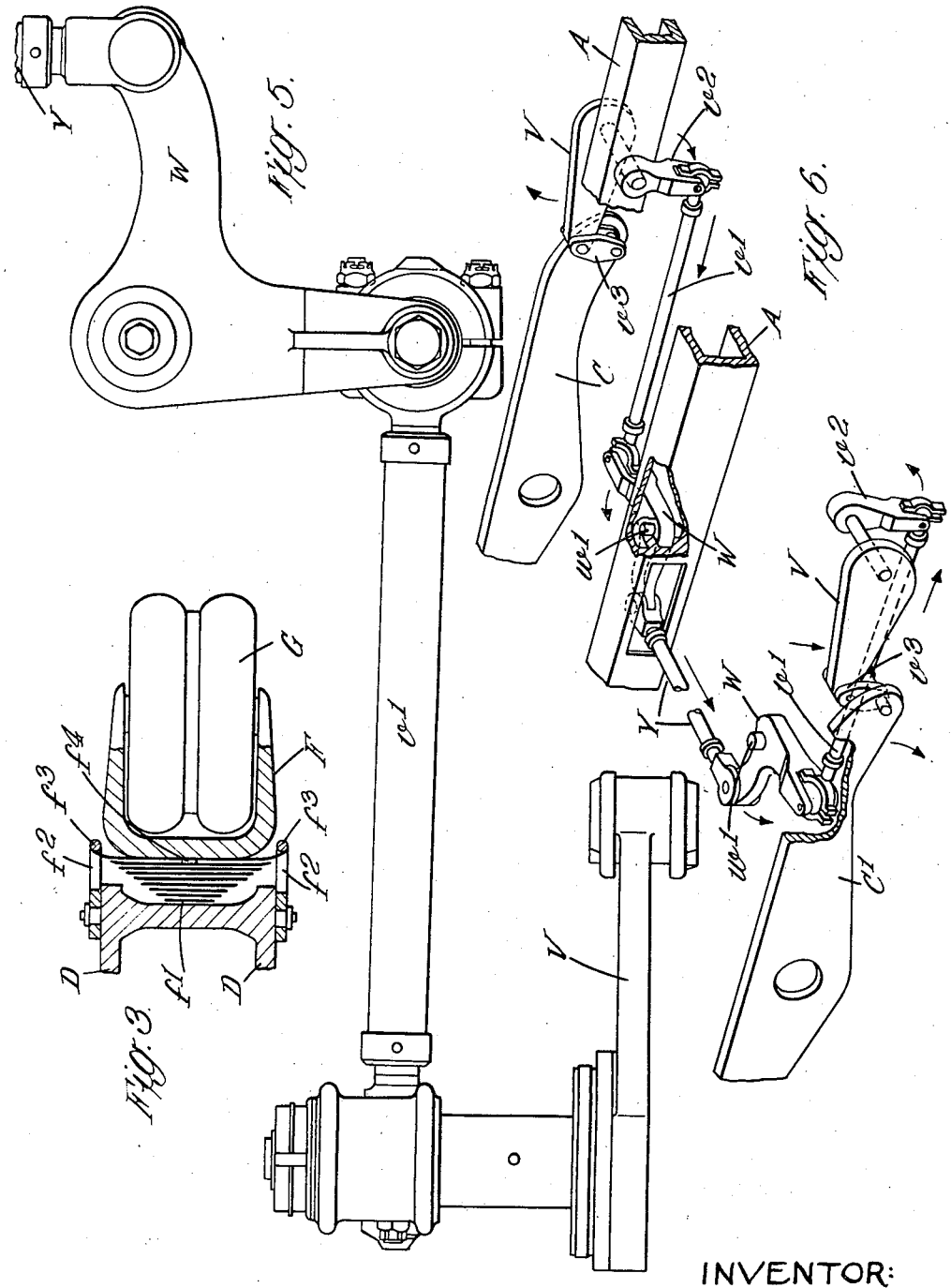
INVENTOR:
NICHOLAS STRAUSSLER
BY Haseltine Lake & Co.
ATTORNEYS Patented Aug. 3, 1937

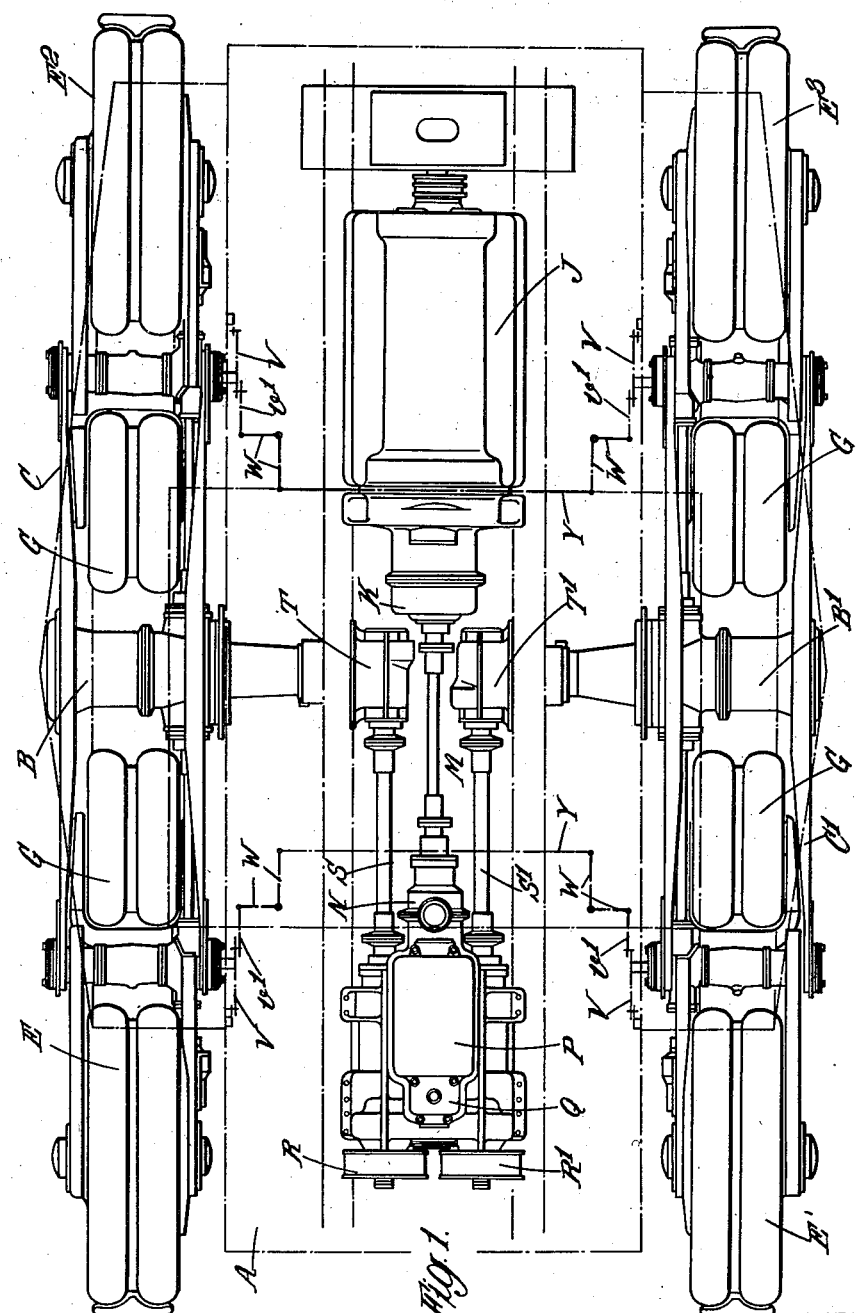

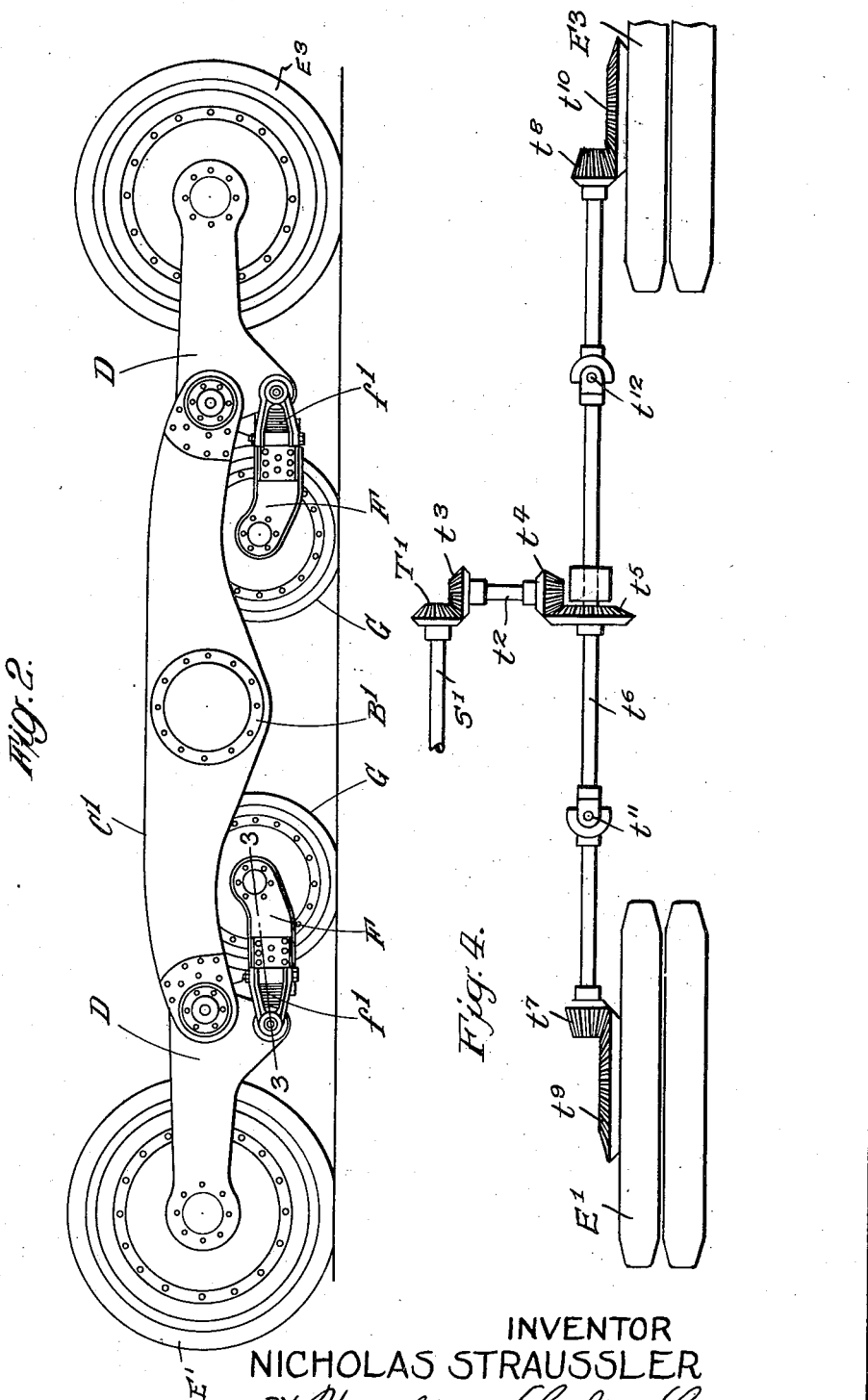

2,089,042

UNITED STATES PATENT OFFICE 2,089,042

WHEEL SUSPENSION FOR ENDLESS TRACK VEHICLES

Nicholas Straussler, London, England, assignor, by mesne assignments, to Alvis-Straussler Limited, Coventry, England, a corporation of England Application September 4, 1935, Serial No. 39,100
In Great Britain March 4, 1935

4 Claims. (Cl. 180—9.1)

This invention relates to track vehicles and especially to the wheel suspension or running gear thereof, and is particularly applicable to vehicles carrying endless tracks running around the driving wheels.

According to the invention the entire running gear for each side of the vehicle is assembled as one unit adapted to oscillate about a horizontal axis transverse in relation to the vehicle. Each running gear frame consists of a longitudinal side member pivoted on a tubular projection from the chassis, and having at one or both ends articulated cross connections with the corresponding side member at the other side of the vehicle, the arrangement being such that, for example, an upward movement of the front or outer end of one side member produces a corresponding downward movement of the front or outer end of the other side member. The outer ends (that is, the front and rear ends) of the oscillatable side members carry the wheel bogies, which are free to oscillate relatively to the side members, each bogie comprising a driving wheel of large diameter on the outer end (front or rear end) of the bogie, and a single or double idler wheel or ground roller on a free arm at the end of the bogie which is directed towards the centre of the vehicle, a spring connection being interposed between this free arm and the main part of the bogie, so that the respective wheels have considerable freedom to oscillate relatively to each other as well as relatively to the rocking side member.

In order that the invention may be clearly understood and readily carried into effect the same will now be described more fully with reference to the accompanying drawings in which:—

Figure 1 is a plan of a vehicle embodying the invention,

Figure 2 is an elevation of one unit of the running gear.

Figure 3 is a section taken on the line 3—3 in Figure 2.

Figure 4 is a diagrammatic plan view of the driving connections between one of the shafts, S, S¹ hereinafter mentioned and the front and rear driving wheels on that side of the vehicle.

Figure 5 is a plan view of a portion of the equalizing gear shown in Figure 2.

Figure 6 represents in perspective the equalizing gear shown in broken lines at the right of Figure 1.

A indicates diagrammatically the vehicle body, on which are tubular projections B, B¹ serving as pivots for the side members C, C¹, to each of which side members free arms D are pivoted, these arms carrying the four driving wheels E, E¹, E², E³. To each of the arms D is pivotally connected another free arm F, the connecting means including a spring $f^1$, and each arm F carries an idler wheel or ground roller G. The weight of the vehicle is so distributed that a much greater proportion of it is borne by the rollers G than by the driving wheels E, E¹, E², E³.

J indicates the motor which is provided with a suitable clutch and starting gear, K a two-speed gear box located under the vehicle floor by which the drive is transmitted to the main shaft M, N the forward and reverse epicyclic gears, P a four-speed gear box, Q a differential gear box, R and R brakes for steering purposes. From the gear box P clutches on the right and left sides respectively transmit the drive to longitudinal shafts S, S¹, at the rear ends of which shafts are bevel gears T, T¹, which through differential gearing and bevel gearing in the tubular projections B, B¹ convey the drive to the off side and near side pairs of driving wheels respectively, through longitudinal shafts running fore and aft and provided with universal joints adjacent the mounting centres of the end bogies, the drive being then continued to the driving wheels through bevel gears.

Figure 4 illustrates diagrammatically the drive to the wheels on one side of the vehicle. On a countershaft $t^2$ are mounted bevel wheels $t^3$, $t^4$, the latter driving a bevel wheel $t^5$ on a longitudinal shaft $t^6$, on which are mounted bevels $t^7$, $t^8$ driving bevel wheels $t^9$, $t^{10}$ on the stub axles of the wheels E¹, E³ respectively, universal joints $t^{11}$, $t^{12}$ being also provided.

The transverse articulating system may be in the form of a rocking bar, or in the form of a shaft with a differential gearing interposed between its two ends, with a suitable linkage and arms connecting the shaft ends to the side members C, C¹. Alternatively such an articulating system may be made up of rods, preferably in tension, and bell cranks. A suitable system is indicated diagrammatically in Figure 1 and in perspective in Figure 6. Each of the side members, C, C¹ consists of inner and outer plates carried by the tubular members B, B¹ between which plates the upper parts of the wheels G enter, as will be clearly seen in Figures 1 and 2. To each end of the inner plate of each member C or C¹ is connected by a shackle link $v^3$ one arm of a bell crank lever V journalled in the chassis A, and movable about a horizontal axis, the other arm $v^2$ being pivotally connected with a rod $v^1$, which rod is in turn pivotally connected with a bell crank lever W which can turn about a vertical pivot $w^1$, this lever W being connected with a transverse rod Y, which is likewise connected with the counterpart lever W at the other side of the vehicle. If on uneven ground the wheels $E^3$ and G descend, permitting the beam $C^1$ to rock about its center $B^1$ in the direction of the arrow seen at the lower part of Figure 6, this rocking movement is imparted by the shackle link to the adjacent lever V $v^2$ through the rod $v^1$ to the lever W and rod Y, thence through the opposite lever W, rod $v^1$, and lever V to the beam C, which is thus tilted up in the direction of the arrow seen at the top of Figure 6. The lift of the right hand end of the beam C tends to cause a depression of its left hand end, which is linked by a similar system of levers with the left hand end of the beam $C^1$, and while the said left hand end of the beam $C^1$ is positively lifted due to the descent of its right hand end, the resistance to depression of the left hand end of the beam C is transmitted through the system of levers to the beam $C^1$.

What I claim and desire to secure by Letters Patent of the United States is:—

1. An endless track vehicle having running gear for each side of the same, comprising a longitudinal swinging beam pivoted at its center, to each end of which beam a bogie is pivoted, the said bogies projecting to the front and rear, respectively, each bogie supporting a driving wheel and an idler wheel, and each bogie comprising separately swingable arms directly carrying said driving wheel and said idler wheel, there being a spring joint intercontrolling the motion of said arms.

2. In an endless track vehicle, a pair of longitudinal beams located at opposite sides of the chassis, each of said beams being pivoted approximately centrally of the vehicle on a lateral projection from the chassis and having a longitudinal extension articulated thereto at each end to carry a driving wheel, an arm articulated to each of said extensions and extending towards the said lateral projection to carry an idler wheel, and a system of linkage between each end of said beam and the corresponding end of the opposite beam whereby an upward movement of one end of the beam at one side transmits a downward movement to the corresponding end of the opposite beam through the extent of said movements.

3. In an endless track vehicle, a pair of longitudinal beams located at opposite sides of the chassis, each of said beams being pivoted approximately centrally of the vehicle on a lateral projection from the chassis and having a longitudinal extension articulated thereto at each end to carry a driving wheel, and an arm articulated to each of said extensions and extending towards said lateral projections to carry an idler wheel, said extension being adapted to swing in a vertical plane about its point of connection with said beam so that rising and falling movements of the driving wheels are reduced in transmission to the beams.

4. In an endless track vehicle, a pair of longitudinal beams located at opposite sides of the chassis, each of said beams being pivoted approximately centrally of the vehicle on a lateral projection from the chassis and having a longitudinal extension articulated thereto at each end to carry a driving wheel, an arm articulated to each of said extensions and extending towards the said lateral projection to carry an idler wheel, said arm being shorter than said extension to distribute the weight transmitted from the point of articulation of the said extension with the beam unevenly so that a greater proportion of said weight is borne by the idler wheel than by the driving wheel.

NICHOLAS STRAUSSLER.